Oct. 30, 1956  J. M. WALLACE ET AL  2,769,058
LINE SECTIONALIZERS
Original Filed July 21, 1950

INVENTORS
James M. Wallace and
Andrew W. Edwards.
BY
Ralph H. Swingle
ATTORNEY

United States Patent Office 2,769,058
Patented Oct. 30, 1956

2,769,058
LINE SECTIONALIZERS

James M. Wallace, Montclair, N. J., and Andrew W. Edwards, East McKeesport, Pa., assignors to Westinghouse Electric Corporation, East Pittsburgh, Pa., a corporation of Pennsylvania Original application July 21, 1950, Serial No. 175,272, now Patent No. 2,656,491, dated October 20, 1953. Divided and this application April 9, 1953, Serial No. 347,642

7 Claims. (Cl. 200—108)

Our invention relates to improvements in line sectionalizing equipment for rural distribution lines, and it has particular relation to an improved line-sectionalizer having a double-armature self-resetting electromagnetic counter or integrator.

This application is a division of our copending application Serial No. 175,272, now Patent No. 2,656,941, October 20, 1953, entitled "Integrators for Line-Sectionalizers," which was filed on July 21, 1950, and assigned to the assignee of the present invention.

These line sectionalizers are inserted at intermediate points along a distribution line, for cooperation with a recloser which is connected at the power input end of the line. The recloser opens its line contact, thus deenergizing the line, in response to overcurrents corresponding to, or exceeding, the minimum expectable fault magnitude, after which the recloser quickly recloses its line contact, and if the fault has not cleared itself during the open-circuit condition of the line, the recloser immediately operates again, and keeps on alternately deenergizing and energizing the line, as long as the fault persists, until a predetermined number of operational counts have been made, usually four, after which the recloser locks its line contact open and permanently deenergizes the protected distribution line. The line sectionalizers subdivide the distribution line into a number of sections. Each sectionalizer counts any rapidly repetitive overcurrent conditions in its section, and at a count which is less than the recloser count, the sectionalizer opens its line contact during a no-current period of the recloser.

The counting mechanisms or integrators of both the recloser and the sectionalizers must be self resetting, so that, if the overcurrent conditions stop before the final count is made, the counting mechanism will slowly drift back to its initial position, ready for a new count. The two common types of slowly acting resetting means for such integrating devices are mechanical escapements and hydraulic dashpots. Mechanical escapements are critical to build, because of friction and corrosion problems. Hydraulic dashpots are simple, corrosion-resistant, and dependable, but they require the use of a liquid, which has usually meant that the entire circuit-interrupting device has been immersed in liquid.

Sectionalizing devices are preferably air-insulated, to save expense, because their circuit-interrupting duty is zero, since the circuit is disconnected during a time when the current flow has been interrupted by an open condition of the recloser. One solution to the problem of providing liquid in a dashpot which operates an air-insulated device has been to use some sort of hermetically closed dashpot, having a flexible wall or bellows which moves to communicate the integrating intelligence to the outside of the sealed dashpot. However, the deflection of the flexible wall or bellows absorbs considerable energy, and thus is often not desirable.

Our present invention relates to another solution of the problem, wherein the dashpot is movably suspended inside of a magnetic circuit, with means for moving the whole dashpot when the time has come to indicate the completion of the integrator count. Thus, the dashpot does not have flexible walls, it remains stationary while the preliminary counting operation is going on, and at the last count it finally moves a slight distance sufficient to effect the desired tripping operation.

Our means for controlling the dashpot, in the manner just indicated, involve the use of a tubular dashpot housing, having two normally spaced axially movable armatures therein, separated by a spring, and biased toward one end of the dashpot. The dashpot is mounted with some freedom of axial movement between two separated pole-piece plates of an electromagnet-structure which causes a magnetic flux to flow axially through a portion of the dashpot tube; and the arrangment is such that quickly successive overcurrent-conditions, energizing the electromagnet structure, successively advance the armatures, until they can advance no further, after which the entire dashpot tube will be moved axially. Meanwhile, if the overcurrent conditions cease before the required count has been made, the armatures will drift back slowly, within the dashpot, thus resetting themselves to their initial positions, ready for another count. In some cases, the dashpot uses any kind of a fluid filling, either gas or liquid, not necessarily liquid, and when a gaseous filling is used (such as air), the tubular dashpot may need to be closed at only one end.

With the foregoing and other objects in view, our invention consists in the combinations, systems, structures, parts, and methods of design and operation, hereinafter described and claimed, and illustrated in the accompanying drawing, wherein:

Figure 1:
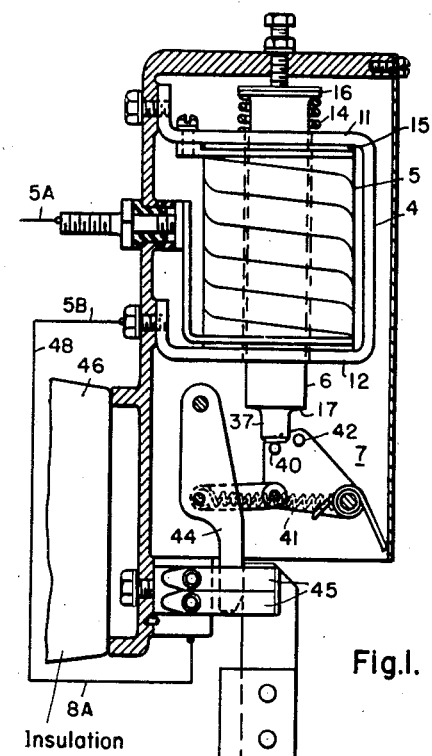
Figure 1 is a diagrammatic side elevational view, with parts broken away, illustrating one form of line sectionalizer with an integrator or counting mechanism, the line sectionalizer having an air-operated disconnect switch.

The essential parts of the line sectionalizer which is illustrated in Fig. 1 include an electromagnetic circuit 4 having a magnetizing coil 5 having terminals 5A and 5B; an axially movable tubular integrator capsule 6; a toggle tripping mechanism 7 which is controlled by the movement of the integrator capsule 6; and an air type disconnect switch 8 which is tripped open by the tripping mechanism 7, said switch 8 having terminals 8A and 8B.

The electromagnetic circuit 4 has two vertically spaced magnetizable pole-piece plates 11 and 12, between which the magnetizing coil 5 is disposed, for energizing the electromagnetic circuit and causing a magnetic flux to flow radially within said coil, between the upper and lower plates 11 and 12. A fluid-filled elongated tubular member or capsule 6 is vertically disposed for axial up-and-down movement within the coil 5, and for this purpose the spaced magnetizable pole-piece plates 11 and 12 are provided with openings 13 which at least partially surround said tubular member 6, so that a magnetic flux flows axially from pole piece to pole piece in an intermediate portion of said tubular member. The tubular member 6 extends both above the upper pole piece 11 and below the lower pole piece 12, and the upper end of the tubular member 6 is biased upwardly by means of a compression spring 14 which rests on the upper pole piece 11. The upwardly biased movement of the tubular member 6 is limited by any suitable means, such as a ring or shoulder 15 carried by the tube underneath the upper pole-piece plate 11.

The two pole-piece plates 11 and 12 cause a magnetic flux to flow vertically axially through only that portion of the tube 6 which is included between said plates. In order that this axial flux may enter inside of the tube, without being bypassed by the walls of the tube, the said tubular member 6 is preferably made of insulating material, as shown, or of other non-magnetizable material.

Figure 2:
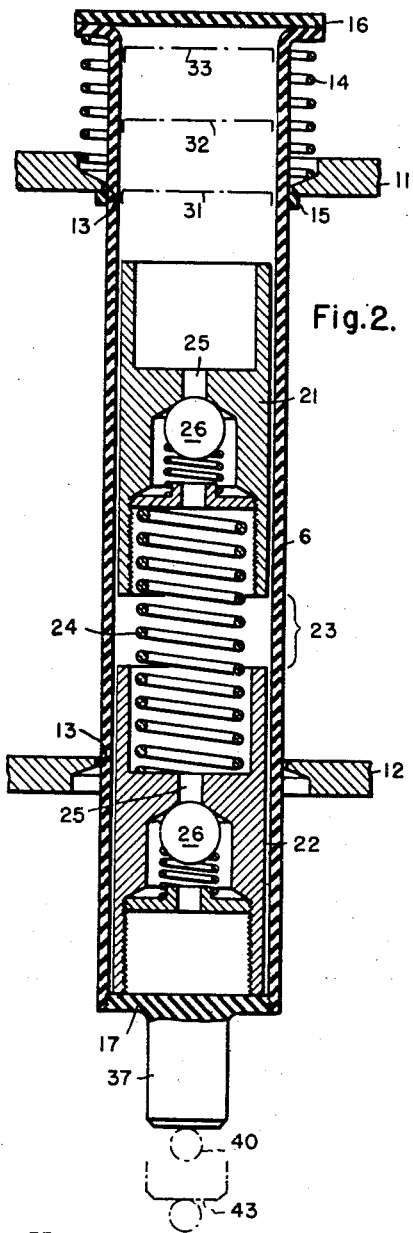
Fig. 2 is a diagrammatic sectional view showing the operation of the sealed integrator-capsule.

The tubular integrator member 6 is preferably liquid-filled, in which case it is hermetically closed at both its top and bottom ends, as indicated at 16 and 17 in Fig. 2. Liquid filling is desirable because it permits the parts of the mechanism to be made with greater tolerances in the various sliding fits, and in general it provides more easily attainable time-delay periods than air-operated time-delay devices. Theoretically, however, and perhaps in some practical cases, our invention can be used with either an air filling or a liquid filling.

As shown in Fig. 2, the tubular member 6 contains two normally spaced armatures 21 and 22 therein, which are normally spaced, with a fixed or predetermined vertical spacing 23 therebetween, under the control of a vertical compression spring 24 which is disposed between the two armatures.

Each of the armatures 21 and 22 is movable vertically axially within the tubular member 6. One-way-acting dashpot means are associated with each of the armatures 21 and 22, whereby each armature may freely move vertically within the tube 6, so far as the fluid action is concerned, but each armature can drop back downwardly at only a slow fluid-restrained rate, under the influence of gravity, which is the means for exerting a resetting biasing force on the armatures 21 and 22, tending to bias said armatures in their resetting direction toward the lower end of the tube 6.

In the illustrated embodiment of our invention, as shown in Fig. 2, each of the armatures 21 and 22 fits within the tubular member 6 with a fit which is sufficiently fluid-tight to oppose rapid fluid flow through said fit in the direction of the axis, the width of this fit being exaggerated in the drawing, for clearness of illustration. Each of the illustrated armatures 21 and 22 also has a fluid-flow passage 25 extending therethrough in the direction of the axis, and each armature has a valve 26 therein for closing said passage, so as to resist rapid fluid flow through said passage when the armature moves downwardly in its biased direction.

The initial biased position of the armatures 21 and 22 is such that the lower armature 22 extends materially below the axial-flux region of the tube 6, that is, materially below the lower pole piece 12. Only a relatively small part of this lower armature 22, at the top end thereof, extends up into this axial-flux region.

Consequently, when the coil 5 of Fig. 1 is sufficiently energized, the lower armature 22 of Fig. 2 will be drawn upwardly part way into said axial-flux region. In other words, the sufficient overcurrent energization of coil 5 will draw the lower armature 22 upwardly away from its normal unattracted position, in which it rests on the bottom end 17 of the tube under the influence of its gravitational resetting force. At the same time, when the coil 5 is sufficiently energized, the two armatures 21 and 22 will be attracted together, compressing the compressible spring 24 therebetween. In this position of the armatures, during the first overcurrent condition in the magnetizing coil 5, the upper armature 21, which had previously lain altogether within the axial-flux portion of the tube, with the top of this upper armature spaced well below the upper pole-piece plate 11, is now advanced its first step upwardly, as indicated at 31 in Fig. 2, so that the top of this upper armature 21 comes at about the place of maximum attraction of the upper plate 11 for this armature, as indicated by the construction line 31 in Fig. 2.

When the magnetizing coil is subsequently deenergized, the compression spring 24 cannot rapidly thrust the lower armature 22 downwardly, because of the fluid-valve or dashpot action, and hence the compression spring 24 advances the upper armature 21 upwardly, to its second advanced position, as indicated at 32 in Fig. 2, in which the upper end of this upper armature 21 is thrust slightly beyond or above the upper plate 11. At this time, the lower end of the lower armature 22 is still below the lower plate 12.

Consequently, if the magnetizing coil is immediately again adequately energized, the magnetic flux will draw the lower armature 22 further up into the axial-flux region of the tube, again compressing the spring 24 between the armatures. The upper armature 21, which now projects slightly beyond the upper end of the axial-flux region, will also be attracted into said axial-flux region, that is, it will be attracted downwardly, but it cannot move quickly downwardly, because of its fluid-valve or dashpot action. Either at this step, or at some future step in the operation, in response to rapidly repeated overcurrent conditions in the magnetizing coil, the lower armature 22 will be drawn up so far that it is practically completely within the axial-flux region.

When the overcurrent condition is now interrupted, the compression spring 24 will thrust the upper armature 21 still further upwardly out of the axial-flux region, in the position indicated at 33 in Fig. 2.

If, now, the overcurrent condition immediately comes on again, the separated armatures 21 and 22 will be strongly attracted toward each other, while at the same time, the upwardly extending upper armature 21 will be strongly drawn downwardly into the axial-flux region between the two plates 11 and 12. The result of this action is to draw the upper armature 21 downwardly, but it cannot move quickly downwardly within the tube 6, because of its fluid-valve or dashpot action, and hence, assuming that at least one end of the tube 6 is closed, the whole tube will be drawn downwardly, with the upper armature 21 compressing the tube-biasing spring 14, and depressing the lower end 17 of the tube.

Figure 3:
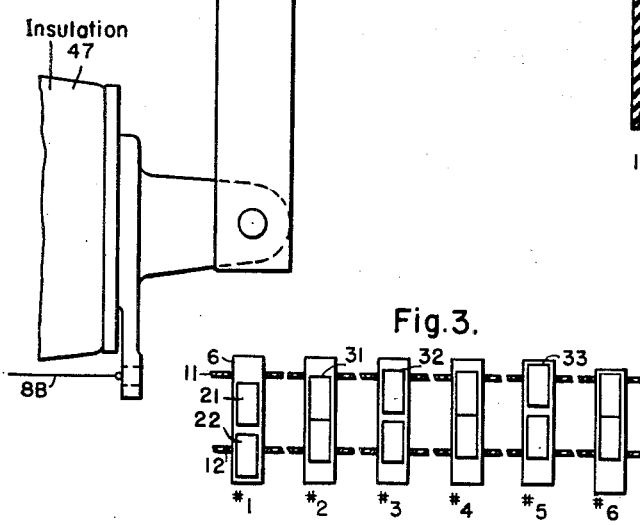
Fig. 3 is a diagrammatic view indicating the successive steps in the operation of the integrator-capsule.

Fig. 3 diagrammatically indicates six positions of the armatures 21 and 22, and of the entire tube or capsule 6. The first position is the normal unattracted position of the armatures 21 and 22, with respect to the capsule 6 and the upper and lower pole-pieces 11 and 12. The second position shows the result of the first overcurrent energization. The third position shows the result of the first no-current period of the recloser (not shown), in which the line current is interrupted by the recloser. The fourth position shows the result of the second overcurrent energization, assumed to occur before the armatures have drifted any significant distance back toward their biased initial position. This fourth position is assumed to be the next-to-the-last permissible overcurrent count. The fifth position shows the result of the next current-zero condition. And the sixth position shows the depression of the entire capsule 6, during the third and last permissible overcurrent energization of the magnetizing coil 5 of Fig. 1.

It will readily be understood that if the prescribed number of successive overcurrent-and-undercurrent conditions do not follow each other in rapid succession, the armatures will reset themselves, ready for another count.

If the object of the integrator is to respond to a predetermined number of rapidly successive overcurrent conditions, any responding means can be used, which is responsive to the downward thrust of the integrator capsule which occurs on the final overcurrent condition, as above described. If, however (as is always the case in line sectionalizers), the purpose of the integrator or counting mechanism is to count a predetermined number of complete cycles of overcurrent-and-undercurrent conditions, then it is necessary to provide some means for responding to only the second half of the forward-and-backward movement of the capsule, when the last overcurrent comes on and goes off. It will be readily understood, of course, that the overcurrent condition which drew the capsule downwardly, as previously described, will hold the capsule in its downwardly displaced position only as long as the overcurrent condition lasts, after which the capsule will immediately return to its upwardly biased position, under the impulse of its lifting spring 14.

There are a number of means for making the integrator response occur on the return stroke of the displaced capsule 6.

As shown in Figs. 1 and 2, the bottom end 17 of the capsule 6 has a depending pin 37, which normally abuts against a trip pin 40 of the toggle linkage 7 in Fig. 1, so that, when the capsule 6 moves downward, it pushes the toggle mechanism past its dead center, into the position in which it is biased toward its tripping position, as by means of a biasing spring 41 in Fig. 1. However, the complete breakage of the toggle is prevented by means of a second pin 42 which abuts up against the side of the depending tripping pin 37 of the integrator, and prevents the toggle from completely breaking until said tripping pin 37 is withdrawn upwardly when the capsule 6 returns to its initial upwardly biased position at the end of the overcurrent condition which caused the downward movement of the capsule. The advanced position of the tripping pins 37 and 40 is indicated in Fig. 2 by means of construction lines 43.

When the toggle mechanism 7 is fully released, it pulls open a tripping lever 44 which pushes open the blade 8 of the disconnect switch of the sectionalizer, thereby permitting said disconnect switch to fall open the rest of the way, by gravity, for example.

The integrator mechanism 6, together with the toggle mechanism 7 and the upper contacts 45 of the disconnect switch, are conveniently mounted on a suitable insulator 46, while the bottom or hinged end of the disconnect switch 8 is mounted on another insulator 47.

Ordinarily, the magnetizing coil 5 and the disconnect switch 8 are connected in series, as indicated in Fig. 1 by the connection 48 between the terminals 5B and 8A, so that the line terminals of the entire line sectionalizer are the terminals 5A and 8B, which are connected in series with the distribution line which is being served by the sectionalizer.

While we have also described but a single illustrative form of embodiment of our invention, we wish it to be understood that we are not limited to the precise illustrated structures or combinations, and we desire that the appended claims shall be accorded the broadest construction consistent with their language.

We claim as our invention:

1. In combination, a releasable response member, release means operable to effect release of said member, electroresponsive means having a magnetic core progressively advanceable in response to repeated overload condition, dashpot means including a sealed casing enclosing said core and movable with said core to effect operation of said release means for releasing said response member and means preventing release of said response member while an overload condition continues.

2. A releasable trip member, electroresponsive means having a magnetic core movable in response to a predetermined value of current, a sealed casing enclosing said core in a fluid medium so as to provide delayed motion and movable therewith only after a predetermined number of movements of said core, and means operable in response to such movement of said casing for effecting release of said trip member, said means including a stop responsive to the flow of current for preventing release of the trip member until the current stops.

3. A trip mechanism for a circuit interrupter comprising, integrating means including electroresponsive means having magnetic core means movably disposed in a sealed casing said core means being progressively advanced during successive overloads for actuating said casing during a period of overload after a predetermined number of closely successive movements of said core means, a releasable toggle mechanism including a lever actuated by a portion of said casing to partly release the toggle mechanism, and means carried by said lever operable to engage a portion of said casing to prevent complete release of said toggle mechanism until the electroresponsive means is deenergized.

4. A tripping device for a circuit interrupter comprising, electroresponsive means having magnetic core means movable in response to greater than a predetermined energization, a sealed casing surrounding said core means and movable therewith during energization of the electroresponsive means after a predetermined number of closely successive movements of the core means, means biasing said casing to return to its original position upon separation of said contacts, releasable toggle means operable in response to said movement of the casing from its original position for effecting a tripping operation, and means including a part carried by the toggle means for preventing release of said toggle means until the electroresponsive means is deenergized.

5. In combination, a movable trip member, electroresponsive means responsive to an energization by overload including a movable member operable to an operating position during an overload after a predetermined number of overloads, biasing means operable to actuate said trip member, toggle means normally disposed in one overcenter position rendering said biasing means ineffective, said toggle means being actuated by operation of said movable member to another overcenter position for rendering said biasing means effective; and means including a projection carried by the toggle means for engaging said movable member for preventing collapse of said toggle means in said another overcenter position until the electroresponsive means is deenergized.

6. A tripping device for a circuit interrupter comprising, a releasable toggle mechanism, movable guide means, magnetic core means movable in said guide means, electroresponsive means including a solenoid for effecting stepping of said core means in response to closely successive overcurrents, one-way stepping means for resisting movement of the core means in the guide means in one direction, means biasing the guide means to a normal position from which it is disposed to be actuated in response to movement of the core means in said one direction after a predetermined number of stepping operations thereof in the other direction for initiating release of said toggle mechanism, and a projection carried by the toggle mechanism operable to engage the guide means when the toggle mechanism is partially released so as to prevent complete release until the overcurrent is terminated.

7. In a circuit interrupter, a tripping lever, a movable casing having a fluid sealed therein, a pair of magnetic core members slidably disposed in said casing, each of said core members having a one-way fluid valve therein for permitting rapid movement of the core members in the casing in one direction only, means biasing the core members apart, electroresponsive means disposed to produce a magnetic flux in response to an overcurrent for attracting the core members, releasable means operable to effect operation of said tripping lever, means for biasing the casing to a normal position relative to the electroresponsive means such that the attraction of the electroresponsive means for the core means moves the casing in the opposite direction to said one-way motion after a predetermined number of stepping operations, to effect partial operation of the releasable means, and stop means mounted on a portion of the releasable means engaging a part of the casing to prevent complete release until the overcurrent ceases.

References Cited in the file of this patent

UNITED STATES PATENTS

| | | |
|---|---|---|
| 2,337,713 | Garlington | Dec. 28, 1943 |
| 2,451,962 | Lindstrom et al. | Oct. 19, 1948 |
| 2,452,233 | Gerard et al. | Oct. 26, 1948 |
| 2,515,530 | Schindler | July 18, 1950 |
| 2,523,984 | Edwards | Sept. 26, 1950 |
| 2,548,079 | Thompson et al. | Apr. 10, 1951 |
| 2,656,491 | Wallace et al. | Oct. 20, 1953 |